No. 11,949. Reissued Nov. 26, 1901.
A. R. FERGUSSON.
LOCK.
(Application filed Mar. 15, 1901.)
2 Sheets—Sheet 1.
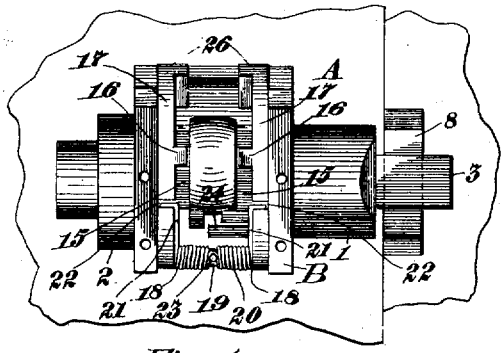
Fig. 1.
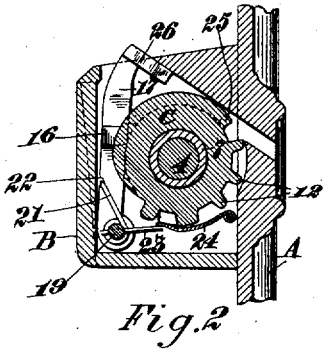
Fig. 2
Fig. 7.
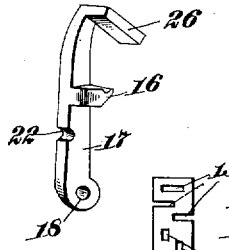
Fig. 3.
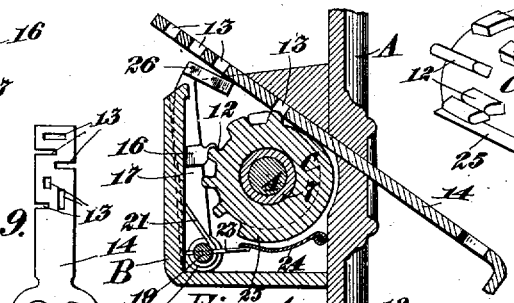
Fig. 8.
Fig. 9.
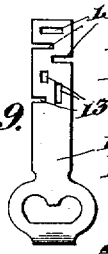
Fig. 4.
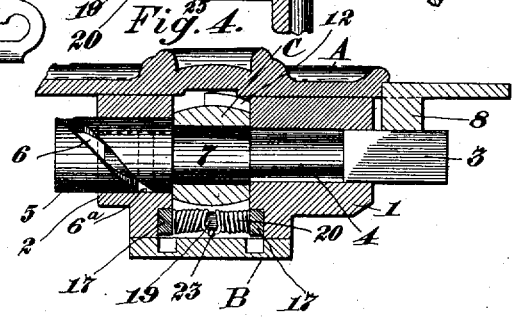
Inventor:
Alan R. Fergusson.
By his Attorney:
F. W. Richards.
Witnesses:
J. Rosenberg
F. W. Nansaud
THE NORRIS PETERS CO., PHOTO-LITHO., WASHINGTON, D. C.

No. 11,949. Reissued Nov. 26, 1901.

A. R. FERGUSSON.

LOCK.

(Application filed Mar. 15, 1901.)

2 Sheets—Sheet 2.

Witnesses:
Jg. Rosenberg
F. W. Marland

Inventor:
Alan R. Fergusson.
By his Attorney:
F. A. Richards.

THE NORRIS PETERS CO., PHOTO-LITHO., WASHINGTON, D. C.

UNITED STATES PATENT OFFICE.

ALAN R. FERGUSSON, OF MOUNT VERNON, NEW YORK, ASSIGNOR TO THE FERGUSSON LOCK COMPANY, A CORPORATION OF NEW JERSEY.

LOCK.

SPECIFICATION forming part of Reissued Letters Patent No. 11,949, dated November 26, 1901.

Original No. 643,955, dated February 20, 1900. Application for reissue filed March 15, 1901. Serial No. 51,379.

*To all whom it may concern:*

Be it known that I, ALAN R. FERGUSSON, a citizen of the United States, residing in Mount Vernon, in the county of Westchester and State of New York, have invented certain new and useful Improvements in Locks, of which the following is a specification.

My invention relates to an improvement in locks, and more particularly to locks for mail-boxes and the like, the object of the invention being to provide a lock which it will be practically impossible to "pick," in which the use of a spring-actuated bolt will be avoided, and which will be comparatively simple in construction, comparatively inexpensive to manufacture, neat in appearance, and most effectual when in use.

With this object in view the invention comprises certain novel features of construction and combinations and organization of parts, one form of which will be more fully hereinafter described, and pointed out in the claims.

Figure 5:
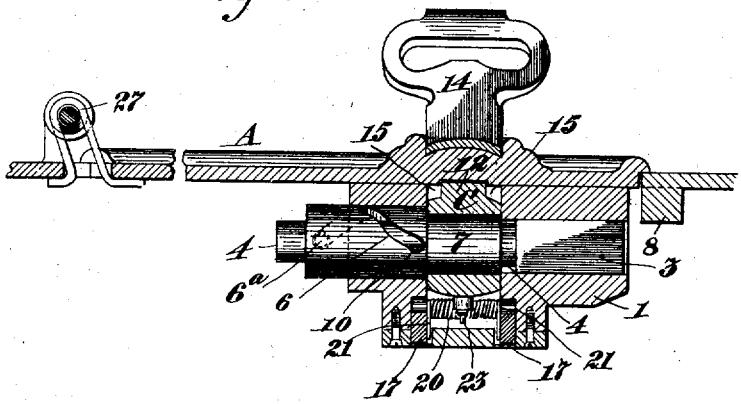
Figure 6:
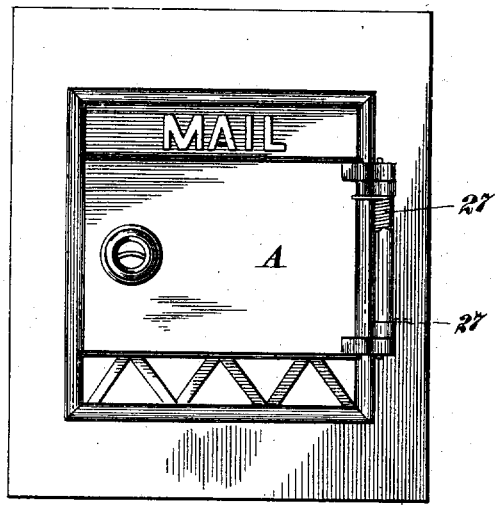

In the accompanying drawings, Figure 1 is a rear view illustrating my improvements. Fig. 2 is a sectional view of the lock, showing the normal position of the parts. Fig. 3 is a similar sectional view showing the positions of the parts when the key is inserted. Fig. 4 is a longitudinal sectional view with the parts in their normal positions. Fig. 5 is a similar view with the key inserted. Fig. 6 is a view of the mail-box, showing my improved lock in place; and Figs. 7, 8, and 9 are views of details.

This improvement comprises in part a locking device, shown comprising a bolt, means for controlling such locking device and designated herein as a tumbler, and means adapted to prevent the movement of said locking device after the partial operation of said controlling means and until engaged and released by the key.

In the construction shown the door of a mail-box A carries a casing B for the parts of this improved lock, said casing being shown integral with or secured to the inner face of the door by brazing or otherwise. The sides of the casing are shown provided with laterally-projecting hollow enlargements 1 2, communicating with the interior of the casing, the enlargement 1 having an angular bore for the accommodation of the angular end 3 of the bolt 4 and the enlargement 2 having a circular bore for the reception of a rotatable sleeve 5, in which the cylindrical inner end of the bolt 4 projects, and said sleeve is provided with a spiral slot 6, into which a pin $6^a$ on the bolt projects for the purpose of causing a longitudinal movement of the bolt when the sleeve is turned, and thus cause the bolt to engage or be released from its keeper 8 when the sleeve 5 is turned in one direction or the other. While the bolt can be readily manipulated by turning the sleeve 5, motion could not well be imparted to the sleeve by pressure applied to the end of the bolt, and hence the bolt could not be worked back by means of an instrument inserted through the door or between the door and jamb. However, to insure against all possibility of the bolt being worked back one end of the slot 6 in the sleeve 5 may be offset slightly to form a shoulder 10, which will constitute an abutment for the pin $6^a$ and constitute a positive lock for the bolt.

The inner end 7 of the sleeve 5 is shown contracted and constitutes a support or holder for my improved bolt-controlling means, shown as a rotary member and designated herein as a tumbler C and to which said tumbler is secured. The tumbler C is shown provided around its periphery with peculiarly-arranged projections 12, adapted to aline with and fit in recesses or cut-out portions 13 in a key 14, which will be more fully hereinafter explained.

The tumbler C is shown provided on each side with peripheral grooves or recesses 15, in which are disposed lugs 16, projecting from arms 17. The arms 17 are shown provided at their lower ends with holes or openings 18 for the reception of a shaft 19, on which said arms are loosely mounted. A double-coiled spring 20 is shown wound on the shaft 19 and provided at its ends with L-shaped arms 21, disposed in recesses 22 in the arms 17 and adapted to normally press the arms 17 against the tumbler C. The central portion of the spring 20 is shown disposed against a pin 23, which projects through the shaft 19 and extends forward and bears against a plate or strip 24, pivoted to the casing and adapted to be pressed against the tumbler to prevent accidental displacement thereof.

The lugs 16, heretofore referred to, are adapted to strike against a projection 25 on the tumbler C when said tumbler is operated by other means than my improved key, as will now be explained. The upper ends of the arms 17 are shown provided with parts or enlargements 26, disposed in the path of the key and in rear of the tumbler, so that as the key rotates the tumbler before the projection 25 is engaged by the lug 16 the end of the key will push the arm 17 out of the way and permit the complete turning of the tumbler to withdraw the bolt. It will thus be seen that should unauthorized persons try to open the door without the aid of the key they would not be able to operate both the tumbler and the arms simultaneously, and hence could not operate the lock.

One of the essential features is the use of means adapted, when other means than the proper key is used, to lock the tumbler or the means controlling the operation of the locking-bolt before the withdrawal of the bolt and adapted when such proper key is used to be engaged and released by such key during the movement of the means controlling the operation of the locking-bolt to permit the complete withdrawal of such bolt.

My improved key 14 is preferably made concavo-convex in cross-section to conform to the shape of the tumbler, and the door is provided with any approved spring-hinge 27 to open the door when the lock is unlocked.

It will also be seen that my improved lock is in no sense a spring-lock, and it is impossible to lock the door without the aid of the key. In fact the key cannot possibly be withdrawn, leaving the lock in its unlocked position, as the mere withdrawing of the key will turn the tumbler and push the bolt forward to its locking position.

Various changes might be resorted to in the form and organization of the several parts described without departing from the spirit and scope of my invention, and hence I would have it understood that I do not wish to limit myself to the details set forth, but consider myself at liberty to make such changes and alterations as fall within the spirit and scope of my invention.

Having fully described my invention, what I claim as new, and desire to secure by Letters Patent, is—

1. In a lock, the combination, with a sliding bolt, of a tumbler adapted to turn thereon and operate the same, and means on the tumbler adapted to be engaged by a key movable tangentially to said tumbler.

2. In a lock, the combination, with a sliding bolt, of a tumbler adapted to turn thereon and operate the same and provided with a rack adapted to be engaged by a key movable tangentially to said tumbler.

3. In a lock, the combination of a sliding bolt and a tumbler mounted on the bolt and adapted to turn thereon and transmit motion to the bolt, said tumbler having projections adapted to mesh with shoulders on a key movable tangentially to said tumbler.

4. In a lock, the combination of a rotatable tumbler having projections adapted to be engaged by a key moved tangentially to the tumbler, a sleeve projecting from said tumbler and having a spiral groove, a bolt passing through the tumbler, and a pin projecting from the bolt and entering said spiral groove.

5. In a lock, the combination, with a bolt and a rotatable tumbler for moving it, of means adapted to be actuated by the key after the tumbler has been partially turned for releasing said tumbler to permit the complete withdrawal of the bolt.

6. In a lock, the combination, with a bolt and a rotatable tumbler adapted to operate said bolt, of a spring-actuated device adapted to prevent the full movement of the tumbler and bolt, and a key adapted to rotate the tumbler, move said device out of line therewith, and effect the full withdrawal of the bolt.

7. In a lock, the combination of a bolt, a rotatable tumbler adapted to operate the bolt, and a shoulder on said tumbler, of a spring-actuated arm having a portion normally in line with the shoulder on the tumbler and adapted to be moved out of line with said shoulder by a key after the tumbler shall have been partially rotated.

8. In a lock, the combination of a bolt, a rotatable tumbler adapted to operate said bolt and having a shoulder, a series of independently-movable spring-pressed arms having portions in the path of said shoulder, and a key constructed and adapted to rotate the tumbler and move said arms out of the path of the shoulder thereon.

9. In a lock, the combination, with a rotatable tumbler, of a locking-bolt adapted to be moved by said tumbler, an arm pivotally connected in proximity to the tumbler, a lug on the arm in the path of a projection on the tumbler, and an enlargement on said arm in the path of the key to be inserted so that when the key is inserted it will strike the enlargement on the arm and force the lug out of the path of the projection on the tumbler and permit the complete rotation thereof to withdraw the bolt.

10. In a lock, the combination, with a rotatable tumbler having peripheral projections and a key to rotate said tumbler by engagement with said peripheral projections, of a bolt means intermediate of the bolt and tumbler for converting the rotary motion of the tumbler into longitudinal movement of the bolt, means for arresting the tumbler before the complete withdrawal of the bolt, and a key for rotating the tumbler and actuating said arresting means to permit the complete movement of the tumbler.

11. In a lock, the combination of a tumbler, a key adapted to rotate said tumbler by engagement with the periphery thereof, pivoted arms adapted to arrest the rotation of the tumbler when the latter is rotated otherwise than by the key, said arms having portions normally in the path of the key and adapted to be engaged by said key to move said arms away from the tumbler, a bolt, and connections intermediate of the tumbler and bolt for moving the latter.

12. In a lock, the combination of a rotatable tumbler and a key adapted to rotate said tumbler, a spring bearing against the periphery of said tumbler to insure its retention in normal starting position, a bolt, and connections between the bolt and tumbler.

13. In a lock, the combination of a tumbler having its peripheral face curved transversely, projections on said peripheral face, a bolt, connections between the tumbler and bolt for operating the latter, spring-actuated devices adapted to arrest the tumbler, and a key curved transversely to conform to the peripheral face of the tumbler and having openings to receive the projections on said peripheral face when moved tangentially thereto to rotate the tumbler and move said spring-actuated devices away from the same.

14. In a lock, the combination of a tumbler, a key adapted to rotate said tumbler by engagement with the peripheral face thereof, shoulders on the tumbler, two independently-movable arms having portions normally in line with said shoulders and also having portions in line with the keyway, a bolt, and means for transmitting motion from the tumbler to the bolt.

15. In a lock, the combination, with a rotatable tumbler having peripheral projections and a bolt actuated by said tumbler, of a pivoted arm adapted to arrest the tumbler, a shutter bearing against the tumbler to retain it in normal starting position, a spring serving to press the pivoted arm and the shutter toward the periphery of the tumbler, and a key for rotating the tumbler and moving said pivoted arm away from the same.

16. A lock embodying a tumbler and means engaging said tumbler and adapted to be engaged and actuated by a key after the tumbler has been partially turned for releasing said tumbler.

17. In a lock, the combination with a bolt and a tumbler, of spring-actuated means in engagement with said tumbler and adapted to be shifted by a key after the tumbler has been partially turned for releasing said tumbler.

18. A lock embodying a tumbler shiftable by a key, and means for locking said tumbler after a partial movement thereof and adapted to be engaged and actuated by a key, thereby to release said tumbler and permit it to be further shifted by the key.

19. In a lock, a bolt, means for controlling the operation of said bolt and adapted to be actuated by a key, and means for locking or preventing the movement of such bolt-controlling means after a partial shifting thereof and until engaged and released by the key.

20. In a lock, a bolt, a rotatable member for controlling the operation of said bolt, and means coöperating with said rotatable member and adapted to be actuated by the key after the partial rotation of said member to permit movement of the bolt.

21. In a lock, a locking means, means for controlling such means, and means for preventing the movement of such controlling means after a partial operation of said controlling means and until engaged and released by the key.

22. In a lock, a locking means, means for controlling such means, and means for preventing the movement of such locking means after a partial operation of said controlling means and until engaged and released by the key.

23. In a lock, a locking means, rotary means for controlling such means and having one or more peripheral key-engaging projections, and means embodying a part projecting tangentially to said rotary means for preventing movement of such rotary means until engaged and released by the key.

24. In a lock, the combination with a latch or bolt, of a tumbler, and an arm in engagement with said tumbler, the organization being such that after the tumbler is partially shifted by the key said key will engage and shift said arm to free the tumbler, and will then continue to shift said tumbler.

25. In a lock, the combination with a rotatable tumbler having one or more peripheral key-engaging projections, and means for arresting the tumbler before the complete rotation thereof and adapted to be engaged and shifted by the key.

26. In a lock, the combination of a tumbler having a projection, an arm working in proximity to the tumbler and carrying a lug in the path of said projection and having a part in position to be engaged by a key by means of which said arm will be shifted to force the lug out of the path of such projection and thereby permit movement of such tumbler.

27. In a lock, the combination of a tumbler having a plurality of shoulders, two independently-movable arms having parts normally in line with said shoulders and also having parts in position to be engaged by a key, by means of which said arms may be shifted to free the tumbler and permit movement thereof.

ALAN R. FERGUSSON.

Witnesses:
HARTWELL P. HEATH,
C. A. WEED.